US012673764B2

(12) United States Patent
Hickman et al.

(10) Patent No.:  US 12,673,764 B2
(45) Date of Patent:      Jul. 7, 2026

(54) MULTIPIVOT USER INTERFACE DEVICES AND RELATED VEHICLE SYSTEMS AND METHODS

(71) Applicant: HONEYWELL INTERNATIONAL INC., Charlotte, NC (US)

(72) Inventors: Alan Hickman, Phoenix, AZ (US); Shuai Chen, Shanghai (CN); Jiankun Ding, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 182 days.

(21) Appl. No.: 18/400,800

(22) Filed: Dec. 29, 2023

(65) Prior Publication Data

US 2025/0214696 A1      Jul. 3, 2025

(51) Int. Cl.
*B64C 27/56*        (2006.01)
*B64C 13/04*        (2006.01)
*B64C 29/00*        (2006.01)
*B64C 13/50*        (2006.01)

(52) U.S. Cl.
CPC ...... *B64C 13/0421* (2018.01); *B64C 29/0008* (2013.01); *B64C 13/503* (2013.01)

(58) Field of Classification Search
CPC ............ B64C 29/0008; B64C 13/0421; B64C 13/503
USPC ........................................................ 318/159
See application file for complete search history.

(56) References Cited

U.S. PATENT DOCUMENTS

| | | | |
|---|---|---|---|
| 8,079,281 B2 | 12/2011 | Taylor et al. | |
| 8,181,914 B2 | 5/2012 | Kopp | |
| 9,242,722 B2 | 1/2016 | Buoy et al. | |
| 9,550,560 B2 | 1/2017 | Buoy et al. | |
| 10,331,232 B2 * | 6/2019 | Parazynski | G08B 5/36 |
| 10,401,855 B2 | 9/2019 | Taylor et al. | |
| 10,689,096 B2 | 6/2020 | Lavallee et al. | |
| 10,967,953 B2 | 4/2021 | Zierten et al. | |
| 11,673,649 B2 | 6/2023 | English et al. | |
| 11,702,191 B1 | 7/2023 | Depenbusch et al. | |
| 2004/0128038 A1 * | 7/2004 | Richter | B64C 13/0425 701/16 |
| 2013/0209256 A1 * | 8/2013 | Yates | B64D 43/00 416/112 |
| 2019/0041891 A1 * | 2/2019 | Parazynski | G05G 1/06 |
| 2019/0078669 A1 * | 3/2019 | Liu | F16H 21/12 |
| 2022/0266983 A1 * | 8/2022 | Starr | G05D 1/87 |

(Continued)

*Primary Examiner* — Gabriel Agared
(74) *Attorney, Agent, or Firm* — Ingrassia Fisher & Lorenz LLP

(57)            ABSTRACT

Fly-by-wire vehicle systems and related user interface devices are provided for controlling operation of a vehicle, such as an aircraft. An exemplary user interface includes a first linkage and a second linkage coupled to the first linkage. The first linkage is actuatable about a first pivot point and the second linkage is actuatable about a second pivot point independent of actuation of the first linkage about the first pivot point. The user interface includes a sensing arrangement configurable to obtain a first orientation of the first linkage with respect to a first reference orientation associated with the first pivot point, obtain a second orientation of the second linkage with respect to a second reference orientation associated with the second pivot point, and determine an input command based at least in part on the first orientation and the second orientation.

20 Claims, 6 Drawing Sheets

(56)                    References Cited

U.S. PATENT DOCUMENTS

2022/0326727  A1 *  10/2022  Cowling ................ G05G 9/047
2023/0127623  A1      4/2023  Connor et al.

* cited by examiner

MULTIPIVOT USER INTERFACE DEVICES AND RELATED VEHICLE SYSTEMS AND METHODS

TECHNICAL FIELD

The subject matter described herein relates generally to human machine interfaces (HMIs) for vehicle systems, and more particularly, embodiments of the subject matter relate to control sticks or other user input devices for vertical take-off and landing (VTOL) aircraft and other fly-by-wire aircraft systems.

BACKGROUND

In some modern aircraft, traditional mechanical flight control systems have been replaced with electrically controlled actuators, often referred to as fly-by-wire. Instead of mechanical linkages between cockpit controls and flight control surfaces, propulsion systems and/or lift systems, electrical signals are utilized to communicate movements of cockpit controls to the controllers associated with the appropriate flight control components or systems. Vertical take-off and landing (VTOL) aircraft, urban air mobility (UAM) vehicles and other aircraft non-conventional aircraft typically employ fly-by-wire systems to facilitate operation of any number of different actuators or effectors arranged or distributed at various locations throughout the body of the aircraft.

Dual pilot operations are traditionally employed in the context of many aircraft for safety purposes; however, single pilot operations are utilized for certain types of aircraft and may become more common in the context of UAMs, VTOL aircraft and other newer or emerging vehicle types. While redundancy of systems and units may be maintained in smaller aircraft, transitioning to single operator configurations may result in the reduction of inceptors, control sticks or other HMIs that are present in a single pilot operation cockpit relative to cockpits configured for dual pilot operations. Accordingly, it is desirable to provide HMIs or other user input devices that are not susceptible to a single point of failure. Other desirable features and characteristics will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Fly-by-wire vehicle systems and related user interface devices and operating methods are provided. An exemplary user interface includes a first linkage actuatable about a first pivot point, a second linkage coupled to the first linkage, the second linkage being actuatable about a second pivot point, the second linkage being actuatable about the second pivot point independent of actuation of the first linkage about the first pivot point, and a sensing arrangement including one or more sensing elements to obtain a first orientation of the first linkage with respect to a first reference orientation associated with the first pivot point, obtain a second orientation of the second linkage with respect to a second reference orientation associated with the second pivot point, and determine an input command based at least in part on the first orientation and the second orientation.

In one embodiment, a method of operating a vehicle using a user interface device including a plurality of linkages having a plurality of pivot points is provided. The method involves obtaining, via one or more sensing elements, indicia of a respective orientation angle associated with a respective linkage associated with a respective one of the plurality of pivot points, resulting in a plurality of orientation angles, determining an input command angle based on the plurality of orientation angles, determining an orientation adjustment command for the vehicle based on a relationship between the input command angle and a reference angle, determining an actuation command for an actuation system associated with the vehicle based at least in part on the orientation adjustment command, and providing the actuation command to the actuation system associated with the vehicle to operate the actuation system in accordance with the input command angle.

In another embodiment, an aircraft system is provided that includes a flight control component actuatable to influence at least one of a position and an attitude of an aircraft, a user interface including a plurality of linkages having a plurality of pivot points to output an input command based on respective orientation angles associated with respective linkages of the plurality of linkages relative to a respective one of the plurality of pivot points, a flight control module coupled to the user interface to determine an actuation command for adjusting the at least one of the position and the attitude of the aircraft based at least in part on the input command, and an actuation system coupled to the flight control module to receive the actuation command and actuate the flight control component in accordance with the actuation command.

Furthermore, other desirable features and characteristics of the subject matter described herein will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
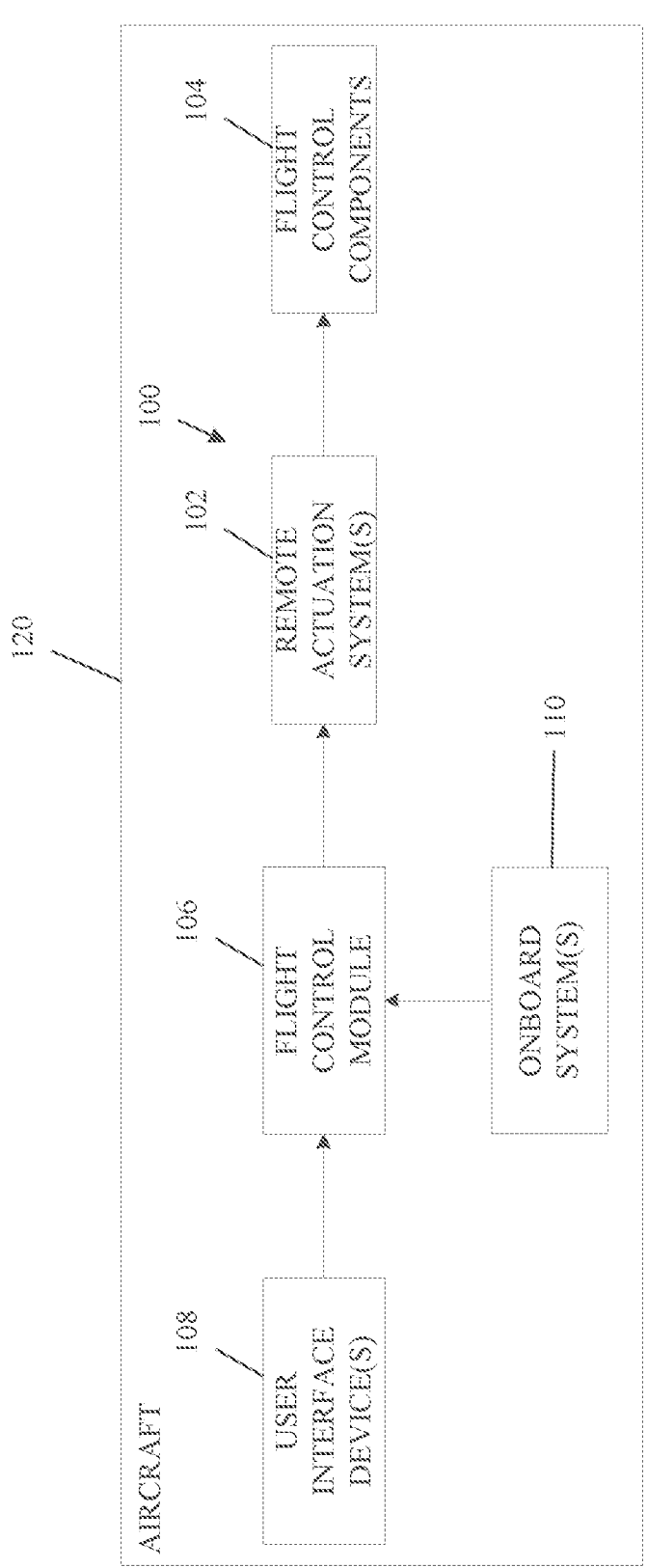
FIG. 1 is a block diagram illustrating a fly-by-wire system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to electrically-controlled vehicle systems. For purposes of explanation, the subject matter is described herein primarily in the context of an aircraft where flight control components are controlled using electrical signals, however, the subject matter is not necessarily limited to use with fly-by-wire aircraft and may be implemented in an equivalent manner for other types of vehicles (e.g., automotive vehicles, marine vessels, or the like). That said, exemplary embodiments may be described herein in the context of urban air mobility (UAM) vehicles or other vertical takeoff and landing (VTOL) aircraft that includes various remote actuation systems that actuate or otherwise operate flight control components which provide lift, propulsion, and/or attitude control for the aircraft, such as, for example, a flight control surface actuator, lift fan, motor, or similar flight control component capable of adjusting or otherwise influencing a position or orientation of the aircraft.

As described in greater detail below, in exemplary implementations described herein, a control stick, inceptor or other human machine interface (HMI) device associated with a fly-by-wire aircraft is realized as a multipivot user interface device that includes independently rotatable linkages. For purposes of explanation, the subject matter may be described primarily herein in the context of a dual pivot user interface device (which may be alternatively referred to herein as a dual pivot control stick), however, it should be appreciated that the subject matter described herein is not limited to only two pivots and in practice may include any number of pivot points and corresponding linkages to support the desired operation and provide the desired level of redundancy and resiliency.

In exemplary embodiments, a dual pivot control stick user interface device includes a first linkage rotatable about a first pivot point and a second linkage coupled to the first linkage, where independently rotatable about a second pivot point independent of the first linkage. In this regard, both linkages may be rotatable about the respective pivot points in similar directions with the same number of degrees of freedom or axes of control, but without the rotation or lack of rotation of one of the linkages impairing rotation of the other linkage, such that a jam or other physical condition impairing rotation of one of the linkages does not impact rotation of the other linkage. In exemplary implementations, a sensing arrangement associated with the user interface device includes one or more sensing elements that are configured to measure or otherwise obtain a first orientation angle corresponding to the orientation of the first linkage with respect to the first pivot point and a second orientation angle corresponding to the orientation of the second linkage with respect to the second pivot point. The respective orientation angles of the linkages can be added or otherwise combined to arrive at an input command angle that reflects the combined actuation of the linkages. Thus, if one of the linkages becomes stuck, jammed or otherwise impeded from freely rotating, the other linkage can continue to be independently actuated in an intuitive manner to compensate for any intermittent or permanent loss of one of the linkages and maintain control using the dual pivot control stick.

By providing multiple mechanical linkages on one user interface device, the multipivot user interface device effectively provide a single control stick with redundant mechanical transmission paths which mitigate a potential jam or other inoperable condition of one of the mechanical linkages while maintaining the same pattern of manual control to generate the output manual control command. For example, when one mechanical linkage is intermittently jammed or otherwise impeded from actuation in a particular direction, another mechanical linkage remains capable of being activated in the same direction, with the same appendage or physical action by the operator, with the same relationship or correlation between actuation of the other mechanical linkage and the resulting command output by the sensing arrangement or other control scheme associated with the user interface device, such that the operator does not need to appreciably change his or her behavior when interacting with the user interface device. In other words, from a human factors perspective, the pilot or other operator's interaction with the control stick may be effectively impervious to or otherwise unaffected by an issue with respect to any one of the linkages by maintaining the same number of axes of control or degrees of freedom for actuating the remaining linkage(s) of the control stick to produce an output control command that compensates for unavailability of one or more of the linkage(s).

FIG. 1 depicts an exemplary embodiment of a fly-by-wire system 100 suitable for use with a vehicle such as an aircraft 120. In exemplary implementations, the aircraft 120 is realized as a UAM vehicle, a VTOL aircraft, or another aircraft that includes multiple different remote actuation systems 102 that are operable to control or otherwise manage respective flight control components 104 (e.g., propellers, lift fans, flight control surfaces and/or the like) distributed about the body of the aircraft 120, and thereby, control the position, orientation and/or attitude of the aircraft 120. In exemplary implementations, each remote actuation system 102 manages a unique flight control component 104 (or a set of flight control components) that is different from those flight control components 104 managed by other remote actuation systems 102. That said, in practice, some implementations may employ redundancy, where more than one remote actuation system 102 is capable of operating a common flight control component 104, while in other implementations, one remote actuation system 102 is capable of operating multiple different flight control components 104 concurrently.

The remote actuation systems 102 are communicatively coupled to a flight control module 106, which generally represents the processing system, processing device, hardware, circuitry, logic, software, firmware and/or other components of the fly-by-wire system 100 that are configured to receive signals indicative of a sensed or measured position, orientation, or adjustment to user interface devices 108 associated with the aircraft 120 and convert the inputs or adjustments received at the user interface devices 108 into corresponding command signals for one or more flight control components 104 and output or otherwise provide the command signals to the remote actuation systems 102. For purposes of explanation, the flight control module 106 may alternatively be referred to herein as a flight control computer (FCC). The flight control computer 106 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 106 may include or access a data storage element (or memory) capable of storing programming instructions for execution that, when read and executed by the flight control computer 106, cause the flight control computer 106 to support operations of the fly-by-wire system 100. In practice, some implementations may employ redundancy, where multiple different instances of the flight control computer 106 independently determine and provide redundant command signals to a remote actuation system 102 concurrently.

The user interface devices 108 may be realized as one or more cockpit user interface devices onboard the aircraft 120. For example, the user interface devices 108 may be realized as a control stick or joystick including one or more sets of sensors configured to sense the orientation or angular position of a respective control stick with respect to one or more reference axes, with each sensor being coupled to the flight control computer 106 to provide indicia of the user input orientation or angular position of the respective control stick. One or more exemplary arrangements of cockpit user interface devices, sensors, and flight control computers are described and depicted in U.S. Pat. No. 11,155,341, which is incorporated by reference herein.

In practice, onboard systems 110 are communicatively coupled to the flight control computer 106 to provide real-time data and/or information regarding the operation of the aircraft 120 to the flight control computer 106 for analysis in conjunction with the user input received via the user interface device(s) 108. For example, in the context of an aircraft 120, the onboard systems 110 may include one or more avionics systems that support navigation, flight planning, and other aircraft control functions, and in practice, will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system. Based on the data or information received from the respective onboard systems 110 and the user input to a respective user interface device 108, the flight control computer 106 commands for controlling the position of or otherwise operating one or more of the flight control components 104 to adjust the position and/or attitude of the aircraft 120.

During operation of the aircraft, the flight control computer 106 continually analyzes the outputs of the user interface devices 108 and the onboard avionics systems 110 to determine corresponding commands for how the respective flight control components 104 should be operated in response to adjustments or changes to the user interface devices 108 substantially in real-time. In this regard, in exemplary implementations, the flight control computer 106 calculates or otherwise determines a rate or amount of actuation associated with a particular flight control component 104 to adjust the position and/or attitude of the aircraft 120 in a manner corresponding to the user input received via a user interface device 108 and provides a corresponding command signal to the remote actuation system 102 associated with that flight control component 104 to effectuate the received user input. In exemplary embodiments, the flight control computer 106 calculates or otherwise determines a desired rate and direction of actuation for a motor or other actuator associated with a remote actuation system 102 to produce the desired actuation of the flight control component(s) 104 associated with that remote actuation system 102 to adjust the position and/or attitude of the aircraft 120 in the desired manner and provides a corresponding command signal to the remote actuation system 102 for implementation.

As described in greater detail below, in exemplary embodiments, at least one of the user interface devices 108 is realized as a dual pivot control stick user interface device or other multipivot user interface device. The multipivot user interface device 108 includes at least a first linkage rotatably coupled to a first pivot point and a second linkage rotatably coupled to a second pivot point and rotatable about the second pivot point independent of rotation of the first linkage about the first pivot point. The multipivot user interface device 108 also incorporates or otherwise includes a sensing arrangement including one or more sensing elements to measure or otherwise obtain a first orientation angle indicative of a first orientation of the first linkage with respect to a first reference orientation associated with the first pivot point and a second orientation angle indicative of a second orientation of the second linkage with respect to a second reference orientation associated with the second pivot point.

The respective orientation angles indicative of the current user input actuation of the multipivot user interface device 108 are added, summed or otherwise combined to determine an input actuation command angle. In this regard, if rotation or other actuation of one of the linkages becomes inhibited due to an intermittent jam or other mechanical condition, the pilot or other operator may continue rotation or actuation of the other linkage to arrive at the same combined input actuation command angle that would otherwise result during normal operation in the absence of that inhibiting condition, thereby allowing operator to maintain controlled operation of the aircraft 120 in a relatively seamless and intuitive manner. The sensing arrangement associated with the multipivot user interface device 108 outputs or otherwise provides indicia of the combined input actuation command angle to the flight control computer 106, which, in turn, determines one or more corresponding actuation commands to be provided to the actuation systems 102 to operate or otherwise actuate the flight control components 104 in accordance with actuation of the multipivot user interface device 108 based on the relationship between the combined input actuation command angle and a reference angle associated with the multipivot user interface device 108.

FIGS. 2-5 depict an exemplary implementation of a multipivot user interface device 200 suitable for use as a user interface device 108 in the fly-by-wire system 100 of FIG. 1 in accordance with one or more exemplary embodiments. In this regard, it should be noted that although FIGS. 2-5 depict a dual pivot user interface device including a pair of pivot points and a corresponding pair of linkages, in practice, the subject matter described herein is not intended to be limited to any particular number or configuration of pivot points and linkages. Moreover, it should be noted that although the subject matter may be depicted in a two-dimensional manner or described in the context of a two-dimensional rotation for ease of explanation, it will be appreciated that in practice the subject matter described herein may be configured to support rotation about pivot points with one or more axes of rotation.

The user interface device 200 includes a lower linkage 202 and an upper linkage 204 that are rotatably coupled to one another at an upper pivot point 208 that allows the upper linkage 204 to rotate about the upper pivot point 208 with one or more axes of rotation independent of the lower linkage 202, while the lower linkage 202 is rotatably coupled to a lower pivot point 206 that allows the lower linkage 202 to rotate about the lower pivot point 206 with up to one or more axes of rotation independent of the upper linkage 204. The lower linkage 202 generally represents a control stick, bar, arm or other elongated linkage element having a substantially linear body that includes a rigid material or otherwise provides a substantially rigid actuatable element capable of rotating about the lower pivot point 206 in response to a force applied to the lower linkage 202 that is substantially normal to the longitudinal (or central) axis of the body of the linkage 202.

In a similar manner, the upper linkage 204 generally represents a control stick, bar, arm or other elongated linkage element having a substantially linear body that includes a rigid material or otherwise provides a substantially rigid actuatable element capable of rotating about the upper pivot point 208 in response to a force applied to the upper linkage 204 that is substantially normal to the longitudinal (or central) axis of the body of the linkage 204. In the illustrated embodiment, the length of the upper linkage 204 as measured along the longitudinal (or central) axis of the body of the upper linkage 204 is shorter than (or less than) the length of the lower linkage 202 as measured along the longitudinal (or central) axis of the body of the lower linkage 202. That said, in other implementations, the respective lengths of the upper and lower linkages 202, 204 may be substantially the same or equal to one another, or alternatively, the length of the upper linkage 204 may be longer than (or greater than) the length of the lower linkage 202. For purposes of explanation, but without limitation, the lower linkage 202 may alternatively be referred to herein as the lower grip, and the upper linkage 204 may alternatively be referred to herein as the upper grip 204.

In one or more exemplary embodiments, the lower pivot point 206 generally corresponds the geometric center of a spherical, circular or cylindrical feature of a fastening element 205 that laterally constrains or restricts translational displacement of the lower end 207 of the lower grip 202 to effectively fasten or otherwise maintain the location of the lower pivot point 206 substantially fixed with respect to another body, such as, for example, a control panel, instrument panel, dashboard or other component onboard the cockpit of the aircraft 120 capable of providing a surface for mounting or fastening the user interface device 200 at or near the end 207 of the lower grip 202 via the fastening element 205. For example, in some implementations, the fastening element 205 may be configured to provide a ball joint where the lower grip 202 is freely rotatable about the geometric center of a spherical element that provides the lower pivot point 206. In another implementation, the fastening element 205 may be realized as dowel, rod, bolt or other fastening element having a substantially circular cross-section configured to allow the lower grip 202 to rotate about the geometric center of circular cross-section of the body of the fastening element 205. It should be appreciated that the examples of fastening elements 205 that may be utilized to laterally constraint or otherwise limit translational displacement of an end 207 of the lower grip 202 are not intended to be exhaustive or limiting, and in practice, any number of different types or configurations of fastening mechanisms may be employed to rotatably mount or join the lower grip 202 to the appropriate mounting surface or body within the cockpit of an aircraft or other vehicle. It should also be appreciated that independent of the manner in which the user interface device 200 is mounted to cockpit, instrument panel, dashboard or other portion of a vehicle, at least a portion of each of the grips 202, 204 may be maintained exposed and actuatable by a user.

Similarly, the upper pivot point 208 generally corresponds the geometric center of a spherical, circular or cylindrical feature of a fastening element 210 that laterally constrains or restricts translational displacement of the lower end 211 of the upper grip 204 relative to an upper end 209 of the lower grip 202 to effectively fasten or otherwise maintain the location of the upper pivot point 208 substantially fixed with respect to the upper end 209 of the lower grip 202, and thereby, rotatably couple the upper grip 204 to lower grip 202 at or near the end 209 of the lower grip 202 that is distal to or otherwise opposite from the lower pivot point 206 that is at or near the translationally constrained end 207 of the lower grip 202. In exemplary implementations, the upper end 213 of the upper grip 204 that is distal to the pivot point 208 is free or otherwise unconstrained to provide a free end 213 that allows the upper grip 204 to freely rotate about the upper pivot point 208 independent of the lower grip 202, that is, the orientation or alignment of the lower grip 202 does not impede, impair or otherwise impact the ability of the free end 213 to be displaced to rotate the upper grip 204 about the upper pivot point 208. In this regard, in response to a condition that inhibits, impedes or otherwise impairs ability of the lower grip 202 to rotate about the lower pivot point 206, the upper grip 204 maintains ability to rotate freely and independently about the upper pivot point 208 to allow actuation of the user interface device 200. In this regard, FIGS. 3-5 depict various potential states of actuation of the user interface device 200 that are capable of being achieved by rotation of the grips 202, 204 about the respective pivot points 206, 208.

Figure 3:
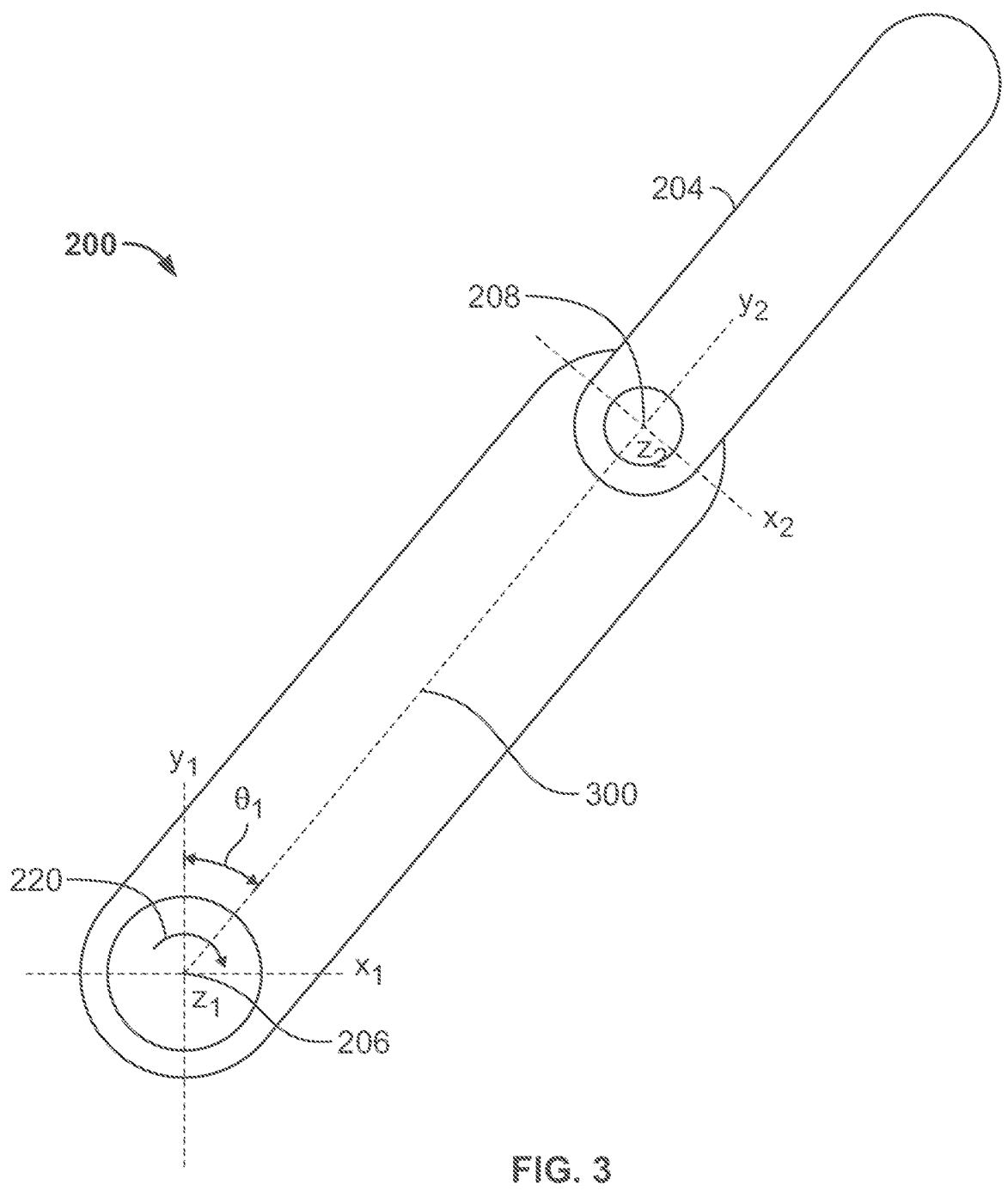
Figure 4:
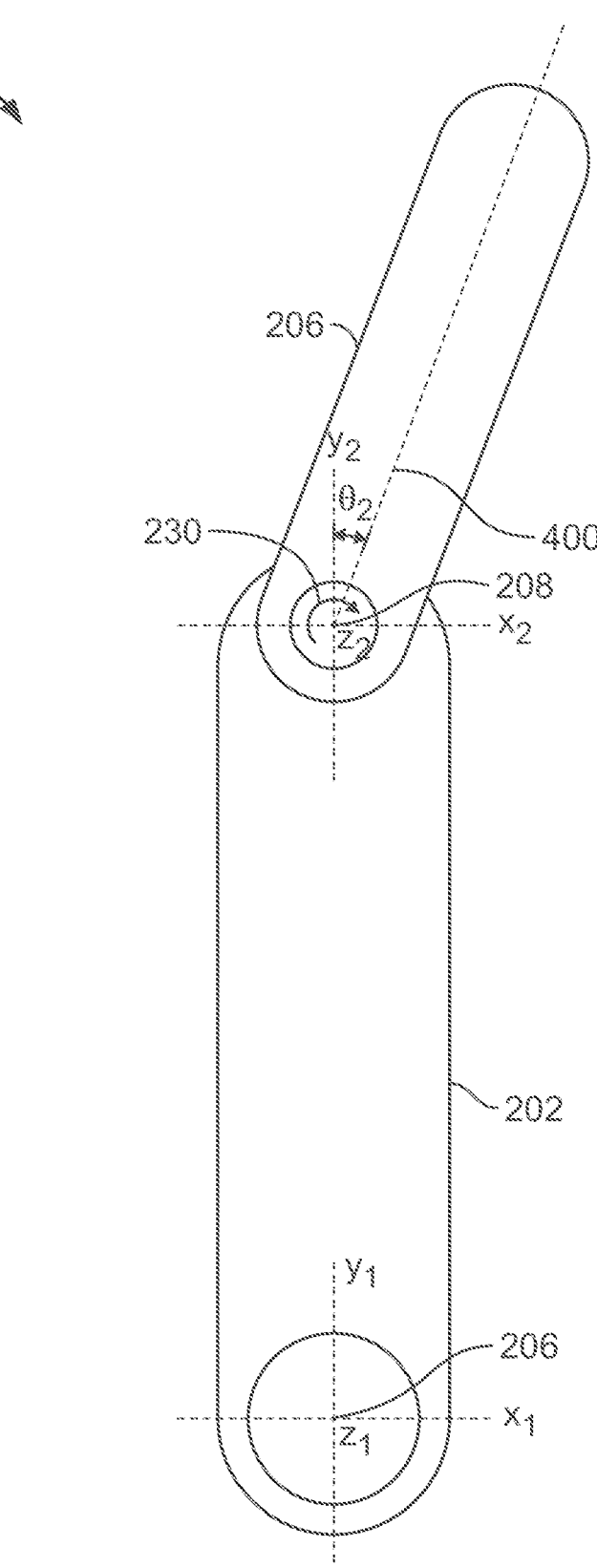
Figure 5:
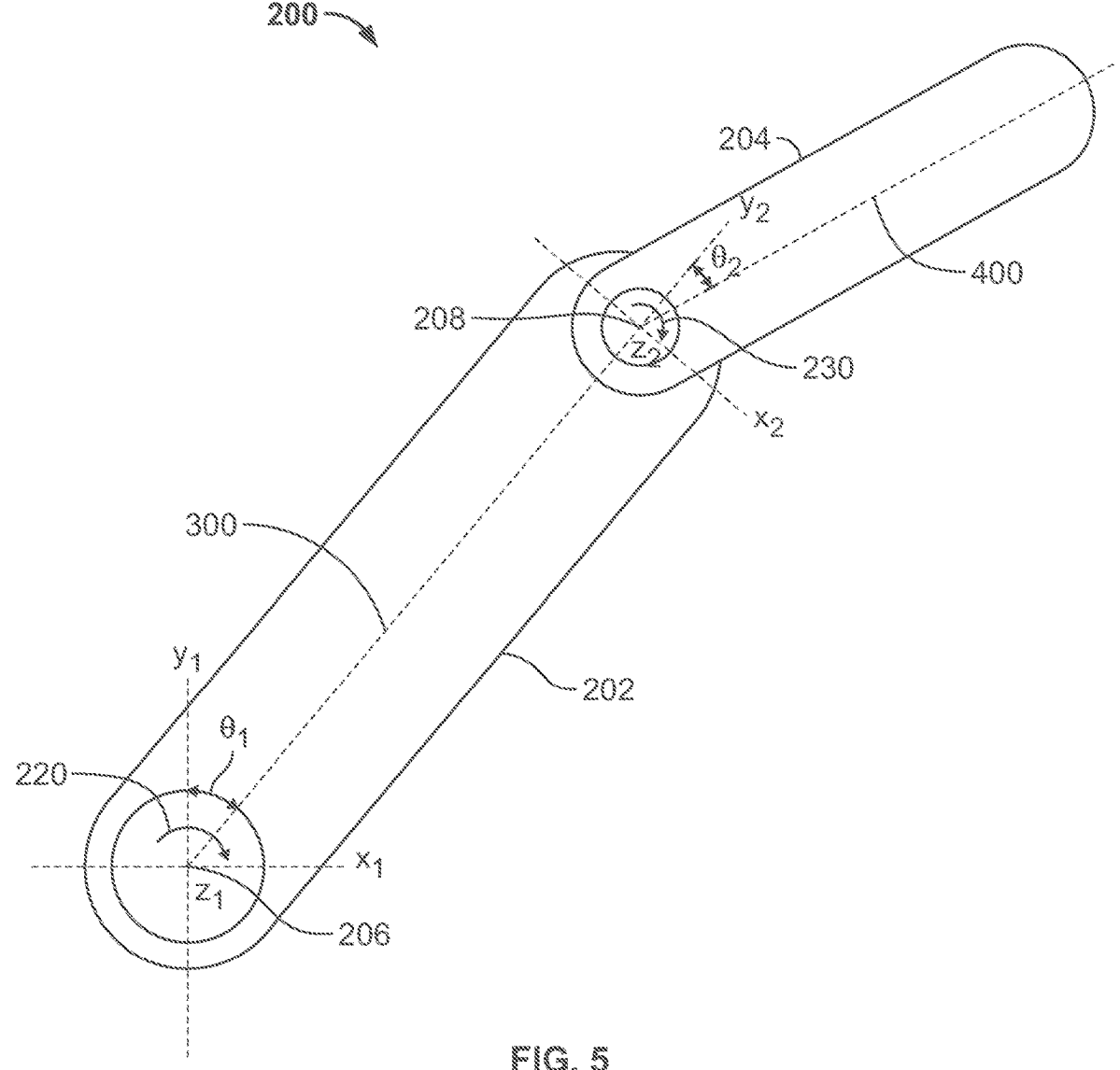

For purposes of explanation, FIGS. 3-5 depict different states of actuation by rotation of the grips 202, 204 about the respective pivot points 206, 208 in a single direction of rotation 220, 230 about a respective axis associated with the respective pivot point 206, 208. That said, it should be noted that in various implementations, the respective grips 202, 204 are independently rotatable about multiple different axes of rotation associated with the respective pivot points 206, 208. For example, the lower grip 202 may be actuatable in three different directions of rotation 220, 222, 224 about respective orthogonal axes $x_1$, $y_1$ and $z_1$ that intersect at the geometric center of the lower pivot point 206. In a similar manner, the upper grip 204 may be actuatable in three different directions of rotation 230, 232, 234 about respective orthogonal axes $x_2$, $y_2$ and $z_2$ that intersect at the geometric center of the lower pivot point 206. That said, in some implementations, the respective grips 202, 204 may be actuatable to rotate about the respective pivot points 206, 208 in fewer than three directions of rotation, as depicted in FIGS. 3-5.

In exemplary embodiments, the multipivot user interface device 200 includes or otherwise incorporates a sensing arrangement that includes one or more sensing elements that are configurable to obtain measurements of an orientation angle indicative of the orientation or angular actuation of the respective grip 202, 204 relative to a reference orientation associated with the respective pivot point 206, 208. For example, the multipivot user interface device 200 may include one or more sensing elements that are integrated with, incorporated with, or otherwise coupled to the lower pivot point 206 to measure the orientation angle indicative of the angular position of the lower grip 202 with respect to a reference orientation associated with the lower pivot point 206. Similarly, the multipivot user interface device 200 may include one or more sensing elements that are integrated with, incorporated with, or otherwise coupled to the upper pivot point 208 to measure the orientation angle indicative of the angular position of the upper grip 204 with respect to a reference orientation associated with the upper pivot point 208. For example, in some implementations, a rotary variable differential transformer (RVDT) sensor may be coupled to or otherwise incorporated with the pivot points 206, 208 to obtain measurement data indicative of the angular position of the respective grip 202, 204 that is rotatable about the respective pivot point 206, 208. In some embodiments, sets of multiple RVDT sensors may be installed at each of the pivot points 206, 208 to provide redundant electrical outputs.

In exemplary implementations, the multipivot user interface device 200 also includes or otherwise incorporates one or more centering mechanisms associated with the respective pivot points 206, 208 to maintain the angular position of the respective grip 202, 204 aligned with the respective reference orientation associated with the respective pivot point 206, 208 in the absence of actuation or other force applied by a user to one or more of the grips 202, 204. For example, FIG. 2 may depict an unactuated state of the multipivot user interface device 200 where centering springs associated with the respective pivot points 206, 208 of the multipivot user interface device 200 have aligned the respective grips 202, 204 with the reference orientation corresponding to zero degrees of rotation of the respective grip 202, 204 about the respective z-axis of rotation (e.g., $z_1$ and $z_2$) such that the longitudinal axes of the grips 202, 204 is aligned parallel to the y-axis associated with the respective pivot point 206, 208 (e.g., $y_1$ and $y_2$). In one or more implementations, the tension of the centering springs associated with the respective pivot points 206, 208, such that one grip 202, 204 is preferentially actuated relative to the other grip 202, 204 in response to a force applied to the multipivot user interface device 200. For example, the tension of the centering spring associated with the upper pivot point 208 may be greater than the tension of the centering spring associated with the lower pivot point 206, such that the lower grip 202 is preferentially actuated in response to a force applied to the multipivot user interface device 200, resulting in an actuation state such as the actuation state depicted in FIG. 3. In such an implementation, once the lower grip 202 reaches an extent of its actuatable range or is otherwise prevented from being actuated further (e.g., due to a jam or other mechanical condition), force applied to the multipivot user interface device 200 may cause actuation of the upper grip 204, resulting in an actuation state such as the actuation state depicted in one of FIG. 4 or 5.

Figure 2:
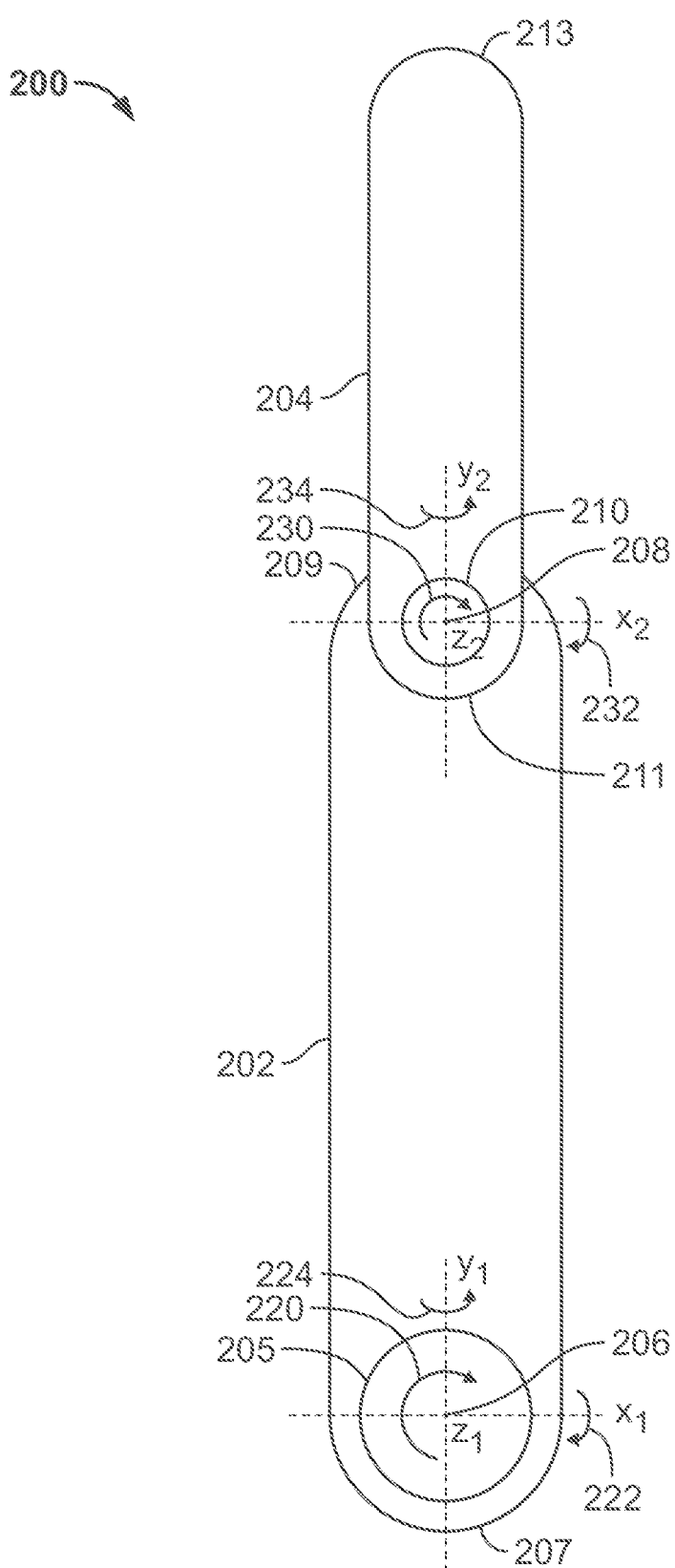
FIGS. 2-5 depict plan views of a multipivot user interface device in different states of actuation suitable for use as a user interface device in the fly-by-wire system of FIG. 1 in one or more exemplary embodiments.

Referring now to FIGS. 3-5, with continued reference to FIGS. 1-2, in exemplary embodiments, the sensing arrangement associated with the multipivot user interface device 200 is configured to calculate or otherwise determine an input command angle corresponding to the user input actuation of the multipivot user interface device 200 based at least in part on the measured orientation angles associated with the respective grips 202, 204. For example, the measured actuation or angular position of the lower grip 202 with respect to the $z_1$ axis of rotation associated with the lower pivot point 206 may be summed, added or otherwise combined with the measured actuation or angular position of the upper grip 204 with respect to the $z_2$ axis of rotation associated with the upper pivot point 208 to arrive at a cumulative input command angle corresponding to the user input actuation of the multipivot user interface device 200 about the respective z axes of rotation.

For example, referring to FIG. 3, the sensing element(s) associated with the lower grip 202 and/or the lower pivot point 206 may output or otherwise provide a measured orientation angle $\theta_1$ in the rotation direction 220 about the $z_1$ axis corresponding to the angular difference between the actuated orientation of the longitudinal axis 300 of the lower grip 202 and the reference orientation aligned with the y axis associated with the lower pivot point 206 that is defined or otherwise maintained by the centering spring associated with the lower grip 202 in the absence of a user input. Concurrently, the sensing element(s) associated with the upper grip 204 and/or the upper pivot point 208 may output or otherwise provide a measured orientation angle of zero due to the longitudinal axis of the upper grip 204 being aligned with the reference orientation of the $y_2$ axis that is defined or otherwise maintained by the centering spring associated with the upper grip 204, resulting in a cumulative input command angle of $\theta_1$. Accordingly, in response to the actuation state depicted in FIG. 3, the sensing arrangement associated with the multipivot user interface device 200 may output or otherwise provide an input command angle of $\theta_1$ to the flight control module 106 for determining corresponding actuation commands for the remote actuation systems 102 and/or flight control components 104.

For the actuation state depicted in FIG. 4, the sensing element(s) associated with the upper grip 204 and/or the upper pivot point 208 may output or otherwise provide a measured orientation angle $\theta_2$ in the rotation direction 230 about the $z_2$ axis corresponding to the angular difference between the actuated orientation of the longitudinal axis 400 of the upper grip 204 and the reference orientation aligned with the $y_2$ axis associated with the upper pivot point 208 that is defined or otherwise maintained by the centering spring associated with the upper grip 204. Concurrently, the sensing element(s) associated with the lower grip 202 and/or the lower pivot point 206 may output or otherwise provide a measured orientation angle of zero due to the longitudinal axis of the lower grip 202 being aligned with the reference orientation of the $y_1$ axis that is defined or otherwise maintained by the centering spring associated with the lower grip 202, resulting in a cumulative input command angle of $\theta_2$. Accordingly, in response to the actuation state depicted in FIG. 4, the sensing arrangement associated with the multipivot user interface device 200 may output or otherwise provide an input command angle of $\theta_2$ to the flight control module 106 for determining corresponding actuation commands for the remote actuation systems 102 and/or flight control components 104.

Referring to FIG. 5, when both the lower grip 202 and the upper grip 204 are actuated with respect to their respective reference orientations, the sensing arrangement associated with the multipivot user interface device 200 calculates or otherwise determines the input command angle by adding the respective amounts of actuation of the respective grips 202. For example, a sensing element associated with the lower pivot point 206 may output or otherwise provide a measured orientation angle $\theta_1$ in the rotation direction 220 about the $z_1$ axis corresponding to the angular difference between the actuated orientation of the longitudinal axis of the lower grip 202 and the reference orientation aligned with the $y_1$ axis associated with the lower pivot point 206. Concurrently, a sensing element associated with the upper pivot point 208 may output or otherwise provide a measured orientation angle $\theta_2$ in the rotation direction 230 about the $z_2$ axis corresponding to the angular difference between the actuated orientation of the longitudinal axis of the upper grip 204 and the reference orientation aligned with the $y_2$ axis associated with the upper pivot point 208. The sensing arrangement associated with the multipivot user interface device 200 may add the respective measured orientation angles to arrive at a cumulative input command angle of $\theta_3$ (e.g., $\theta_3=\theta_1+\theta_2$). Accordingly, in response to the actuation state depicted in FIG. 5, the sensing arrangement associated with the multipivot user interface device 200 may output or otherwise provide an input command angle of $\theta_3$ to the flight control module 106 for determining corresponding actuation commands for the remote actuation systems 102 and/or flight control components 104.

Figure 6:
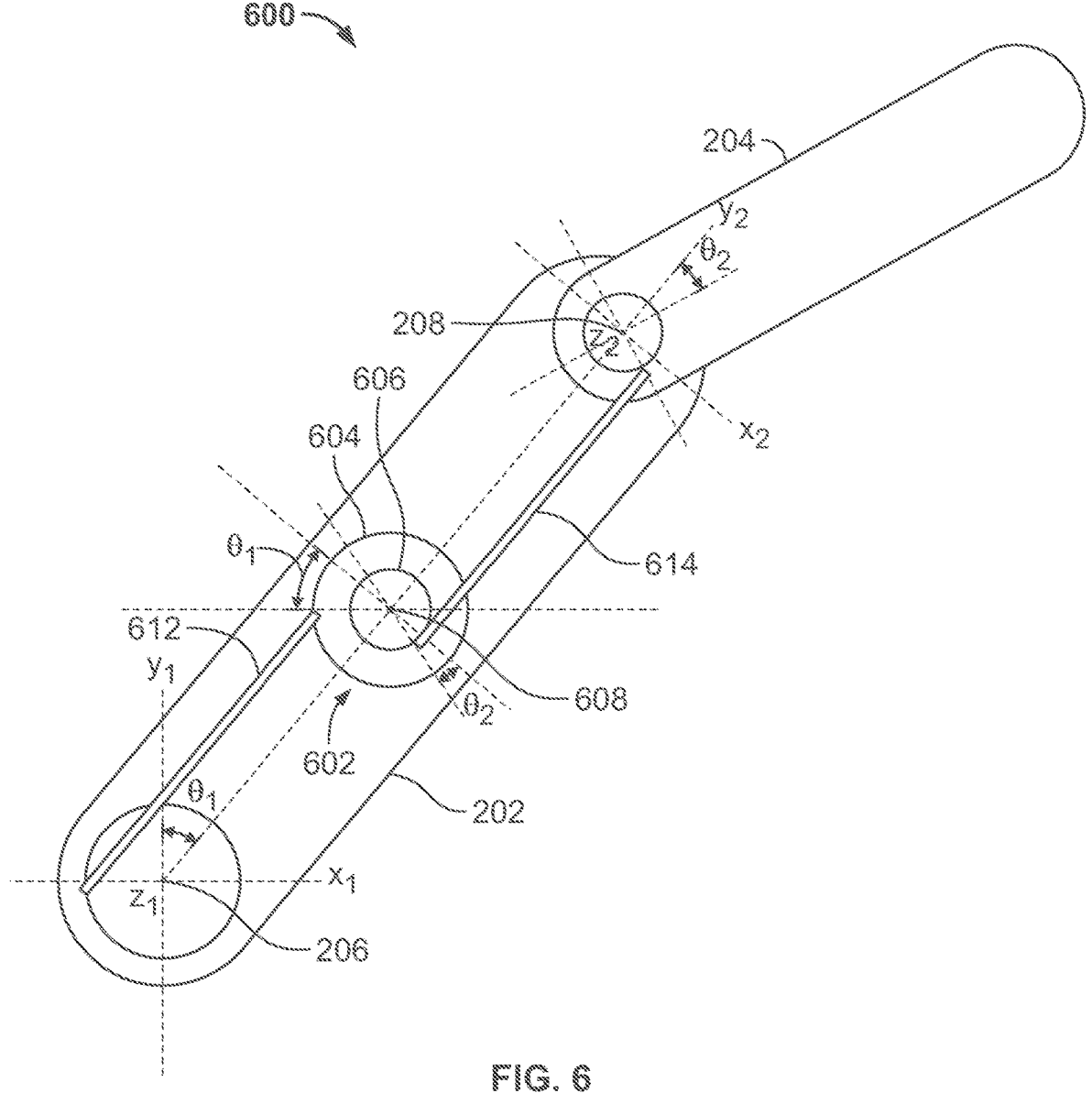
FIG. 6 is a plan view of a multipivot user interface device having an angular position sensor disposed between pivot points of the multipivot user interface that is suitable for use as a user interface device in the fly-by-wire system of FIG. 1 in one or more exemplary embodiments.

Referring to FIG. 6, with continued reference to FIGS. 1-5, in some implementations, a multipivot user interface device 600 may be implemented with a sensing arrangement 602 that includes a single set of sensors that leverages mechanical redundancy rather than electrical redundancy to reduce additional electrical interface requirements on downstream components. As illustrated, the sensing arrangement 602 includes independently rotatable components 604, 606 configurable to rotate about an intermediate (or middle) pivot point 608 disposed between the lower pivot point 206 and the upper pivot point 208 along the longitudinal axis of the lower grip 202. For example, the sensing arrangement 602 may be implemented using a frameless RVDT sensor that provides an electrical output indicative of the angular position of an outer transformer component 604 (e.g., a stator) relative to an inner transformer component 606 (e.g., a rotor) that is rotatable with respect to the outer transformer component 604. The outer transformer component 604 is coupled to a fixed location associated with the lower pivot point 206 via a substantially rigid rod or other transmission linkage component 612 such that rotation of the lower grip 202 to an orientation angle of $\theta_1$ produces a corresponding rotation of the outer transformer component 604 by a corresponding angular rotation of $\theta_1$. In a similar manner, the inner transformer component 606 is coupled to a fixed location associated with the upper pivot point 208 via a substantially rigid transmission linkage component 614 such that rotation of the upper grip 204 to an orientation angle of $\theta_2$ produces a corresponding rotation of the inner transformer component 606 by a corresponding angular rotation of $\theta_2$ in a rotation direction opposite the rotation of the outer transformer component 604. Thus, the rotation of the outer transformer component 604 relative to the rotation of the inner transformer component 606 results in the sensing arrangement 602 disposed at a midpoint between the respective grip pivot points 206, 208 providing an output electrical signal indicative of an input command angle of $\theta_3$ corresponding to the sum of the rotation of the lower grip 202 and the rotation of the upper grip 204.

It should be noted that although FIGS. 2-6 depict implementations where the pivot points 206, 208 are located at or near the ends of the respective grips 202, 204, in practice, one or more of the pivot points 206, 208 may be located at or near a midpoint of a respective grip 202, 204 or another interior location along the longitudinal axis of a respective grip 202, 204. For example, the upper pivot point 208 may be disposed at or near the midpoint of the upper grip 204, which may accommodate more fine-tuned adjustments by actuation of the upper grip 204 in concert with the actuation of the lower grip 202. In this regard, it should be appreciated that the subject matter described herein is not necessarily limited to any particular location of the pivot points with respect to the respective grips 202, 204.

Referring to FIGS. 1-6, by virtue of the multipivot user interface devices 200, 600, the fly-by-wire system 100 is fail operational and resilient in the event of a potential jam or other mechanical condition associated with an inceptor by providing redundantly actuatable mechanical grips 202, 204 that allow a pilot or other vehicle operator to maintain control in a manner that is consistent with normal operation. For example, an intermittent condition that inhibits or prevents actuation of one of the grips 202, 204 may be compensated for by the pilot or operator actuating the other one of the grips 202, 204 in the same or similar manner such that the multipivot user interface device 200, 600 maintains capability of providing the desired input command angle to the flight control module 106 to achieve the desired actuation of the flight control components 104. The respective locations of the pivot points 206, 208, the respective lengths of the grips 202, 204, and the respective spring tensions or centering forces associated with the respective centering springs may vary depending on the needs of a particular application, pilot or operator preferences, usage patterns, or other human factors to provide the desired centering forces, damping and/or other tactile feedback to provide intuitive operation of the multipivot user interface device 200, 600. For example, the centering spring associated with the upper pivot point 208 may be configured to provide a centering force or spring tension that is an order of magnitude greater than the centering spring associated with the lower pivot point 206, such that the lower grip 202 effectively functions as a primary grip for actuation during normal operation with the upper grip 204 functioning as a backup or secondary grip for actuation when actuation of the lower grip 202 becomes inhibited or impeded, with the increased actuation force associated with the upper grip 204 providing tactile feedback to the operator of a potential mechanical condition with respect to the lower grip 202 while maintaining the same control pattern.

In some implementations, the multipivot user interface devices 200, 600 may include a force sensor that is capable of supporting the flight control module 106 or other control module automatically detecting a jam or other mechanical condition, or alternatively, multipivot user interface devices 200, 600 may include a switch or other human machine interface capable of being manually actuated by the pilot or other operator to provide indication of a jam or other mechanical condition. In response to indication of a jam or other mechanical condition with respect to one of the grips 202, 204, in various implementations, the flight control module 106 may be configured to apply a scaling factor or otherwise implement an alternative control scheme using the orientation of the other one of the grips 202, 204 to account for the jam or other mechanical condition to adapt the operation of the flight control module 106 and/or the fly-by-wire system 100 to the current state of the user interface device 108 by compensating for the position of the grip 202, 204 exhibiting a jam or other mechanical condition, so that the flight control module 106 and/or the fly-by-wire system 100 behaves consistently and intuitively in response to actuation of the other one of the grips 202, 204. In this manner, a pilot or other operator may continue to operate the aircraft 120 in what is effectively a normal manner impervious to any jam or mechanical condition by virtue of the continued operability of the multipivot user interface device 200, 600.

For the sake of brevity, conventional techniques related to avionics systems, flight control systems, fly-by-wire systems, control sticks, inceptors or other HMIs, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented in varying ways for each particular application, but such implementation decisions should not be interpreted as causing a departure from the scope of the present invention. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A user interface comprising:
a first linkage actuatable about a first pivot point;
a second linkage rotatably coupled to the first linkage at a second pivot point, the second linkage being actuatable about the second pivot point independent of actuation of the first linkage about the first pivot point;
a sensing arrangement including one or more sensing elements to:
obtain a first orientation of the first linkage with respect to a first reference orientation associated with the first pivot point;
obtain a second orientation of the second linkage with respect to a second reference orientation associated with the second pivot point; and
determine an input command based at least in part on the first orientation and the second orientation.

2. The user interface of claim 1, wherein:
the first linkage is rotatably coupled to the first pivot point;
the first orientation comprises a first orientation angle of the first linkage;
the second orientation comprises a second orientation angle of the second linkage; and
the sensing arrangement is configurable to determine the input command based on the first orientation angle and the second orientation angle.

3. The user interface of claim 1, wherein:
the one or more sensing elements comprises a first sensing element coupled to the first pivot point to obtain a first measurement of the first orientation of the first linkage with respect to the first pivot point and a second sensing element coupled to the second pivot point to obtain a second measurement of the second orientation of the second linkage with respect to the second pivot point; and
the sensing arrangement is configurable to determine the input command based on the first measurement and the second measurement.

4. The user interface of claim 1, the input command comprising a cumulative actuation associated with the user interface, wherein the one or more sensing elements comprises a sensing element coupled to the first pivot point and the second pivot point to obtain the cumulative actuation associated with the user interface based on the first orientation of the first linkage with respect to the first pivot point relative to the second orientation of the second linkage with respect to the second pivot point.

5. The user interface of claim 1, further comprising:
a first centering mechanism associated with the first pivot point to align the first linkage with the first reference orientation; and
a second centering mechanism associated with the second pivot point to align the second linkage with the second reference orientation.

6. The user interface of claim 1, further comprising a control module coupled to the sensing arrangement to determine an orientation adjustment command for a vehicle based on the input command, determine an actuation command for an actuation system associated with the vehicle based at least in part on the orientation adjustment command, and provide the actuation command to the actuation system associated with the vehicle to operate the actuation system in accordance with the input command.

7. The user interface of claim 1, wherein the first linkage and the second linkage are independently rotatable about multiple axes of rotation associated with a respective one of the first pivot point and the second pivot point.

8. The user interface of claim 1, wherein a first location of the first pivot point with respect to the first linkage is different from a second location of the second pivot point with respect to the second linkage.

9. The user interface of claim 8, wherein at least one of the first location and the second location comprises an end of a respective one of the first linkage and the second linkage.

10. The user interface of claim 8, wherein at least one of the first location and the second location comprises a midpoint of a respective one of the first linkage and the second linkage.

11. The user interface of claim 1, wherein:

the first linkage comprises a lower grip; and the second linkage comprises an upper grip.

12. The user interface of claim 11, wherein the first pivot point is disposed proximate a lower end of the lower grip.

13. A method of operating a vehicle using a user interface device comprising a plurality of linkages having a plurality of pivot points, the plurality of linkages including at least a first linkage actuatable about a first pivot point and a second linkage rotatably coupled to the first linkage at a second pivot point, the method comprising:

obtaining, via one or more sensing elements, indicia of a respective orientation angle associated with a respective linkage associated with a respective one of the plurality of pivot points, resulting in a plurality of orientation angles including at least a first orientation of the first linkage with respect to a first reference orientation associated with the first pivot point and a second orientation of the second linkage with respect to a second reference orientation associated with the second pivot point;

determining an input command angle corresponding to a cumulative actuation associated with the user interface device based on the plurality of orientation angles;

determining an orientation adjustment command for the vehicle based on a relationship between the input command angle and a reference angle;

determining an actuation command for an actuation system associated with the vehicle based at least in part on the orientation adjustment command; and providing the actuation command to the actuation system associated with the vehicle to operate the actuation system in accordance with the input command angle.

14. The method of claim 13, wherein determining the input command angle comprises adding the plurality of orientation angles.

15. The method of claim 14, wherein determining the orientation adjustment command comprises determining the orientation adjustment command based on a relationship between the input command angle and a reference orientation associated with the user interface device in an absence of user input.

16. The method of claim 13, wherein the user interface device comprises a plurality of springs associated with respective ones of the plurality of pivot points to regulate the respective orientation angle associated with the respective linkage associated with the respective one of the plurality of pivot points to zero absent user input to the user interface device.

17. The method of claim 16, wherein a respective spring rate associated with a respective one of the plurality of springs is different from respective spring rates associated with other springs of the plurality of springs.

18. The method of claim 13, wherein obtaining the indicia of the respective orientation angle associated with the respective linkage comprises obtaining the plurality of orientation angles via a common shared sensor coupled to each of the plurality of pivot points.

19. The method of claim 13, wherein obtaining the indicia of the respective orientation angle associated with the respective linkage comprises obtaining the respective orientation angle via a respective sensor associated with the respective one of the plurality of pivot points.

20. An aircraft system comprising:

a flight control component actuatable to influence at least one of a position and an attitude of an aircraft;

a user interface comprising a plurality of linkages having a plurality of pivot points to output an input command based on respective orientation angles associated with respective linkages of the plurality of linkages relative to a respective one of the plurality of pivot points, wherein:

the plurality of linkages include at least a first linkage actuatable about a first pivot point and a second linkage rotatably coupled to the first linkage at a second pivot point; and the input command corresponds to a cumulative actuation associated with the user interface determined based at least in part on a first orientation of the first linkage with respect to a first reference orientation associated with the first pivot point and a second orientation of the second linkage with respect to a second reference orientation associated with the second pivot point;

a flight control module coupled to the user interface to determine an actuation command for adjusting the at least one of the position and the attitude of the aircraft based at least in part on the input command; and an actuation system coupled to the flight control module to receive the actuation command and actuate the flight control component in accordance with the actuation command.

*    *    *    *    *